United States Patent [19]

Goguen

[11] 4,410,001

[45] * Oct. 18, 1983

[54] ANTI-SIPHON SELECTOR VALVE

[76] Inventor: Robert P. Goguen, 180 Michael Dr., Campbell, Calif. 95008

[*] Notice: The portion of the term of this patent subsequent to Apr. 27, 1999 has been disclaimed.

[21] Appl. No.: 290,334

[22] Filed: Aug. 5, 1981

Related U.S. Application Data

[63] Continuation-in-part of Ser. No. 118,733, Feb. 5, 1980, Pat. No. 4,326,671.

[51] Int. Cl.³ ............................................. F16K 24/02
[52] U.S. Cl. .................................... 137/217; 137/218; 137/625.11; 137/625.46
[58] Field of Search .................... 137/217, 218, 625.11, 137/625.46

[56] References Cited

U.S. PATENT DOCUMENTS

| | | | |
|---|---|---|---|
| 825,370 | 7/1906 | Zurbuch | 137/625.11 X |
| 2,209,133 | 7/1940 | Parker | 137/625.11 |
| 2,209,134 | 7/1940 | Parker | 137/625.11 |
| 2,209,136 | 7/1940 | Parker | 137/625.11 |
| 2,972,357 | 2/1961 | Ford et al. | 137/625.11 |
| 2,979,963 | 4/1961 | Snoy | 137/625.11 X |
| 2,989,082 | 6/1961 | Ray | 137/625.46 |
| 3,180,352 | 4/1965 | Kersten et al. | 137/218 |
| 3,460,560 | 8/1969 | Kah | |
| 3,828,932 | 8/1974 | Schneer | 137/625.46 X |
| 3,995,494 | 12/1976 | Muller et al. | 137/625.11 X |
| 4,083,383 | 4/1978 | Antoniello | 137/616.7 |
| 4,109,670 | 8/1978 | Slagel | 137/625.11 X |
| 4,125,124 | 11/1978 | Kah | 137/217 X |
| 4,305,417 | 12/1981 | Bell | 137/625.11 X |
| 4,316,480 | 2/1982 | Kah | 137/217 X |
| 4,326,671 | 4/1982 | Goguen | 137/218 X |
| 4,328,832 | 5/1982 | Inada et al. | 137/625.46 |

FOREIGN PATENT DOCUMENTS 928299 6/1963 United Kingdom ........... 137/625.11

Primary Examiner—Gerald A. Michalsky
Attorney, Agent, or Firm—Phillips, Moore, Lempio & Finley

[57] ABSTRACT

An anti-siphon selector valve for directing fluid into one of a plurality of lines. The valve includes a valve body having an input port and a plurality of output ports and a U-shaped conduit assembly mounted on the valve body and selectively connectable between the input port and one of the output ports. A movable piston is located in the conduit assembly for sealing the conduit to the valve body. The valve further includes an anti-siphon valve assembly mounted in the U-shaped conduit assembly for venting the output port and the lines to which it is connected to the atmosphere.

16 Claims, 6 Drawing Figures

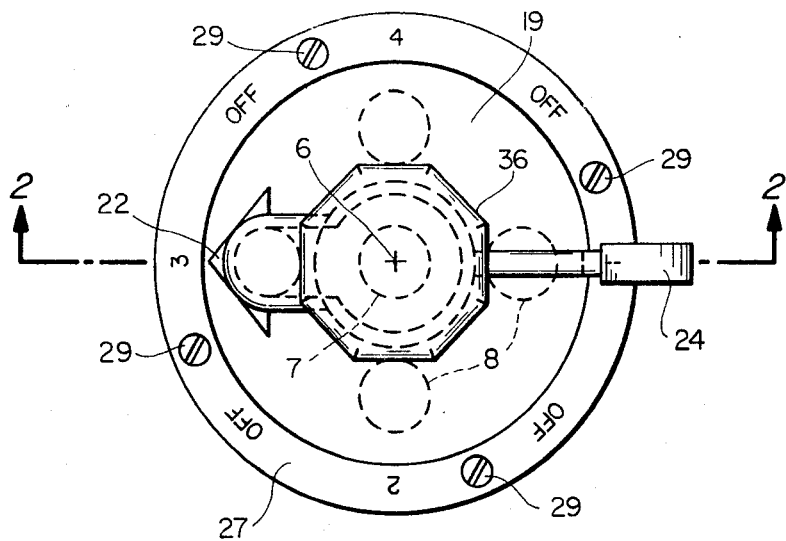
FIG_1
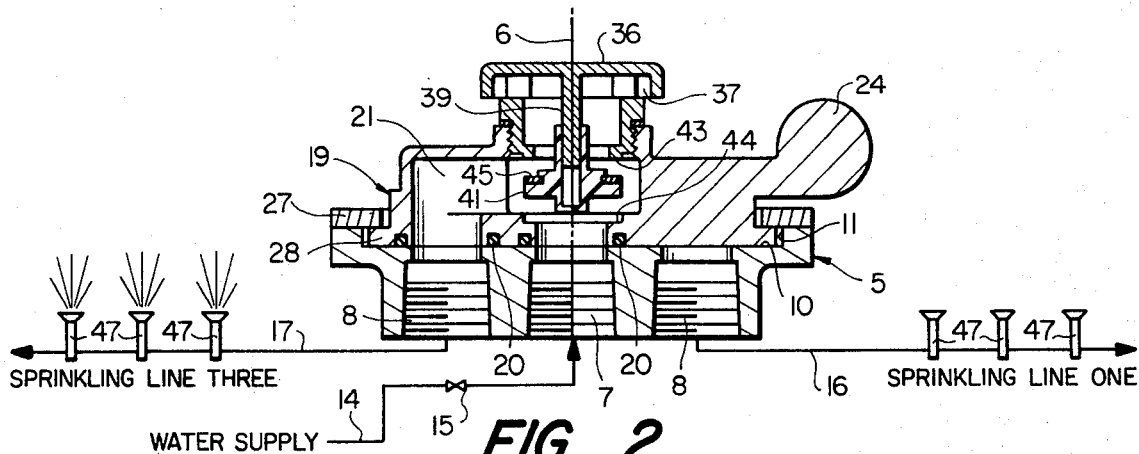
FIG_2
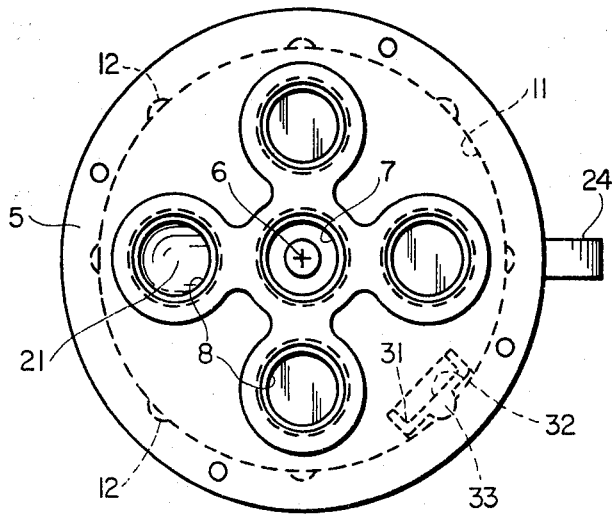
FIG_3

ANTI-SIPHON SELECTOR VALVE

DESCRIPTION

This is a continuation-in-part of application Ser. No. 118,733 filed Feb. 5, 1980, now U.S. Pat. No. 4,326,671.

TECHNICAL FIELD

This invention relates to selector valves for directing a fluid into one of a plurality of lines and to anti-siphon valves that prevent a fluid from being drawn back to its source.

BACKGROUND ART

Water sprinkling systems are commonly used to distribute water to flora including lawns, plants, and trees. A typical sprinkling system includes a manifold which is connected to a source of water under pressure and a plurality of water sprinkling lines connected to the manifold. Each sprinkling line directs water from the manifold to a specific location and terminates in one or more nozzles. The nozzles spray the water directly on the lawn or plants desired to be watered. Each sprinkling line commonly contains a globe valve and an anti-siphon valve. The globe valves control the duration and amount of flow through the sprinkling lines. The anti-siphon valves prevent contaminated water from being brought into contact with a potable water source. These valves prevent the water on the ground from being drawn back through the sprinkling lines. On lawns, for example, ground water can become contaminated from the fertilizers and insecticides which are used in maintaining the lawn.

Although most water sprinkling systems are quite reliable, the manifolds on these systems are complex and expensive. A typical manifold connects to four to eight sprinkling lines and each line includes a globe valve and an anti-siphon valve. Thus, a manifold may contain anywhere from eight to sixteen valves. Further, these water sprinkling systems can be inconvenient to operate because in order to change the water flow from one sprinkling line to another, it is necessary to shut one globe valve and open another. When a substantial number of sprinkling lines are used, this process can be quite time consuming.

The present invention is directed to overcoming one or more of the problems as set forth above.

DISCLOSURE OF THE INVENTION

The present invention contemplates an anti-siphon, selector valve for directing an incoming fluid into one of a plurality of output ports. The valve includes a valve body having an input port and a plurality of output ports, a conduit mounted on the valve body and selectively connectable between the input port and one of the output ports, and an anti-siphon assembly in communication with the conduit for venting the output ports to the atmosphere when the fluid in the valve is substantially atmospheric.

The present invention overcomes the disadvantages of the prior art by incorporating an anti-siphon valve and a selector valve. The resulting valve is able to replace the plurality of valves previously necessary on water sprinkling manifolds and is more convenient to use than prior valves because a single rotary motion changes the flow between the sprinkling lines. Further, the valve disclosed herein has both the advantages of lower cost and simplicity in construction.

Other aspects, objects, and advantages of this invention can be obtained from a study of the drawings, the disclosure, and the appended claims.

BRIEF DESCRIPTION OF THE DRAWINGS

FIG. 1 is a top plan view of a valve according to one embodiment of the present invention.

FIG. 2 is a side elevational view of the valve of FIG. 1 in section taken along line 2—2 of FIG. 1.

FIG. 3 is a bottom plan view of the valve of FIG. 1.

BEST MODE FOR CARRYING OUT THE INVENTION

Figure 4:
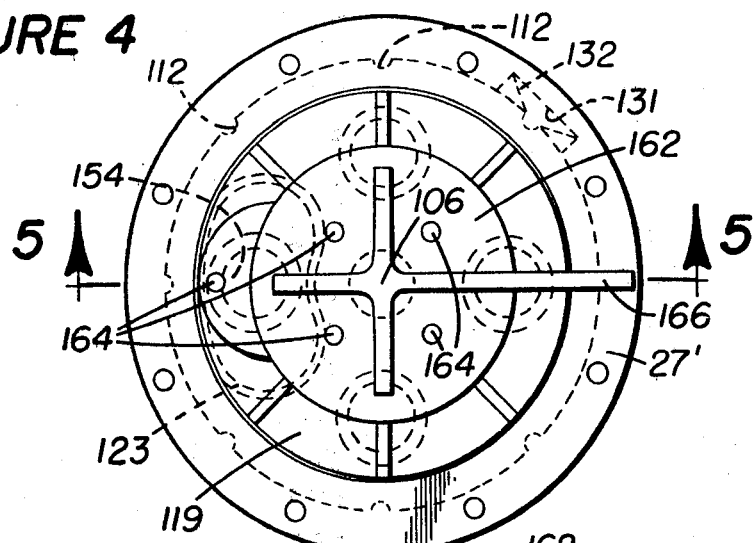
FIG. 4 is a top plan view of a second embodiment of the present invention.

FIGS. 1-3 illustrate a valve according to one embodiment of the present invention. The valve includes a valve body 5 having a generally circular cross section and circular symmetry about the center axis 6. The valve body includes a center input port 7 and four output ports 8 distributed azimuthally around the center axis 6. While all of the output ports may be threaded to receive conventional pipe threads, it is more convenient when valve body 5 is made of a plastic such as polyvinychloride (PVC) to provide slip joints to permit gluing of fittings or pipes. In FIG. 2 it can be seen that an input conduit 14 from the water supply is connected to the input port 7. The water supply is shut off by an isolation valve 15 of conventional construction. The output ports are each connected to sprinkling lines, for example, line number one, 16 and line number three, 17. In addition, the valve body has a stepped circular notch 10 located around the outside of circle of output ports 8. The notch receives the selector member 19 described below. Located in the side wall 11 of the notch are a plurality of recesses 12 which receive a detent 31 also described below.

Referring to FIG. 2, the anti-siphon, selector valve includes a hollow selector member 19 that is mounted for rotation about the center axis 6 with respect to the valve body 5. The selector member is received in the stepped notch 10 in the valve body and has a plurality of O-ring grooves 20 each containing an O-ring. As illustrated in FIG. 3, the O-rings seal the ports 7, 8 between the valve body 5 and the selector member 19 when the selector member is aligned to direct incoming fluid into one of the output ports. The selector member also includes a U-shaped conduit 21 which selectively communicates between the input port 7 and one of the output ports 8. As shown in FIG. 2, the conduit has first and second parallel legs and a connecting medial leg. The first or inside leg of the conduit is coaxial with the center axis 6 of the valve. The second or outside leg of the conduit selectively communicates with the output ports 8.

The selector member 19 is moved by hand around the center axis 6 of the valve using a fin 24 so that the U-shaped conduit is successively brought into communication with each of the output ports 8. The selector member 19 is retained in the notch 10 using a retaining ring 27 and is thereby permitted to rotate around the center axis 6. The retaining ring engages a flange portion 28 of the selector member and forces the selector member against the valve body 5. The retaining ring 7 is held in place by a plurality of bolts 29.

Referring to FIG. 1, the top of the retaining ring 27 is marked with numerals indicating the corresponding output ports. The position of the conduit 21 is indicated by the arrow 22 on the selector valve. As indicated in FIG. 1 the second leg of the conduit 21 is in communication with sprinkling line three. It should be noted in FIG. 1 that the output ports 8 are azimuthally spaced apart sufficiently to that the U-shaped conduit is blanked off when it sits in between the ports. This is the off position where no flow is permitted through the valve.

Referring to FIG. 3, the selector member 19 also includes a spring loaded detent 21 which engages the recesses 12 in the sidewall 11 of the notch 10. The detent is captured in a small cavity in the side wall of the flange portion 28 of the selector member. The detent is urged in an outward direction away from the center axis 6 along a radius of the valve. The detent can be the unitary plastic member illustrated in FIG. 3. The member has a generally U-shaped cross section and the medial portion 32 resiliently deforms inward when the bead portion 33 is rotated out of the recess 12. A compression spring and ball bearing can also be used.

A cap 36, FIG. 2 is threaded into the top of the selector member 19 along the center axis 6 to a position directly above the input port 7. The cap contains a plurality of orifices 37 which permit communication between the conduit 21 and the atmosphere. Located in the center of the cap is a guide rod 39 which is coaxial with the center axis 6 of the valve. The guide rod is an integral part of the cap and is used to guide the motion of a piston 41 located within the conduit 21. The piston slides up and down along the guide rod between an upper seat 43 formed by the bottom wall of the cap and a lower seat 44 formed in the bottom wall of the conduit 21. The piston has a gasket ring 45 which ensures sealing against leakage when the piston is urged against the upper seat 43. The piston slides up and down in response to the pressure of the fluid flowing through the conduit 21 and the force of gravity. When the piston is urged against the upper seat 43 by fluid pressure, conduit 21 is sealed from the atmosphere and the fluid flowing through the valve is prevented from escaping. When the piston 21 is urged away from the upper seat 43 and toward the lower seat 44 by the force of gravity, the output port 8 is vented through the conduit 21 and the cap 36 to the atmosphere. The piston, the guide rod and the seats form an anti-siphon valve as described below.

The anti-siphon, selector valve is placed in operation by connecting the input port 7, FIG. 2 to a water supply using an input conduit 14. The isolation valve 15 separates the valve and the water sprinkling lines 16, 17 from the water supply. The isolation valve 15 is optional because the conduit 21 is blanked off by the valve body 5 at the intermediate positions between the output ports 8. The output ports 8 are each connected to water sprinkling lines. Each line contains at least one nozzle 47 for directing the water onto the flora selected to be watered.

To direct a flow of water through the valve, the selector member 19 is rotated with respect to the valve body 5 to a position which places conduit 21 in communication with the input port 7 and the selected output port 8. As illustrated in FIG. 1, four output ports are available in this embodiment. Next, the isolation or control valve 15 is opened. The resulting water pressure in the conduit 21 causes the piston 41 to raise, engage the upper seat 43 and seal conduit 21 from the atmosphere. Water flows through the conduit, out the selected output port and into the sprinkling line 17.

If the water pressure in conduit 21 drops to substantially atmospheric pressure, the piston 41 falls by gravity and drops away from the upper seat 43. Conduit 21 is then vented to the atmosphere. This venting prevents any siphon from being created between the selected sprinkling line 17 and the input conduit 14. Thus, contaminated ground water cannot be drawn from the nozzles back through the valve to the potable water supply.

To select a different sprinkling line, the selector member 19 is rotated with respect to the valve body 5 using the fin 24. The selector member rotates about the center axis 6 of the valve and the conduit 21 is brought sequentially into communication with all of the output ports. It should be noted in FIG. 2 that when the selector member is rotated, this rotation occurs about the axis of the guide rod 39 and hence the piston 41 and the input port 7 remain constantly in communication with conduit 21.

Figure 5:
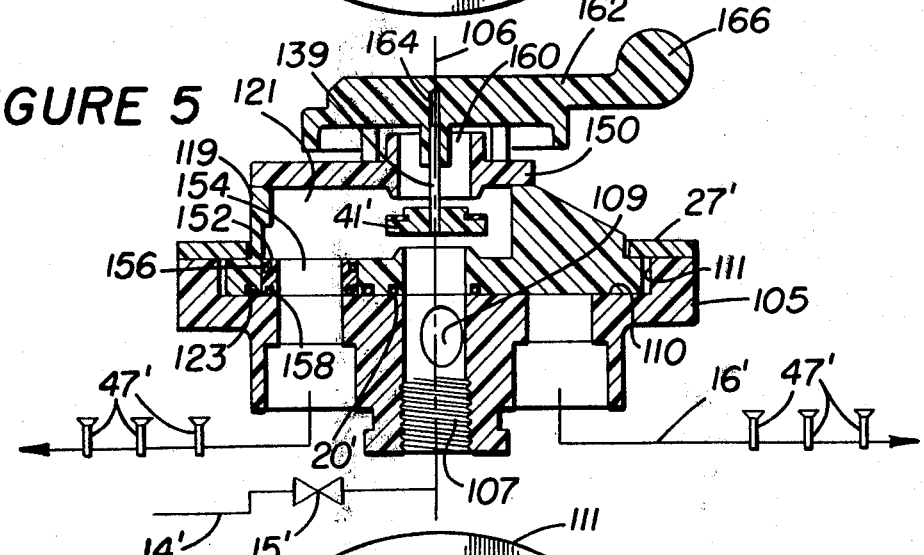
FIG. 5 is a side elevational view of the valve of FIG. 4 in section taken along line 5—5 in FIG. 4.
Figure 6:
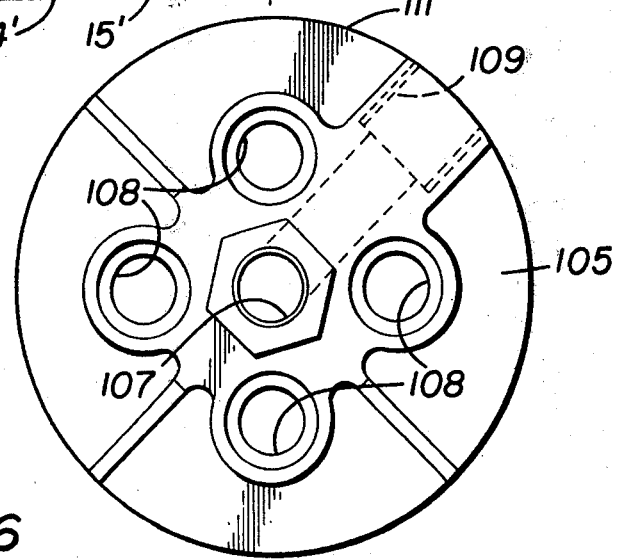
FIG. 6 is a bottom plan view of the valve shown in FIG. 4.

Referring now to FIG. 4, a second embodiment of the valve just described is shown. The numerals utilized in the embodiment depicted in FIGS. 4, 5, and 6, where the elements are the same, are the same figures with a prime following the figure; whereas new elements carry numbers starting with 105 and corresponding to the numbers utilized in the first embodiment described. In FIG. 5, a valve body 105 has the generally circular cross section of the anti-siphon valve described herein and further defines a central axis 106. The valve body 105 includes a center input port 107 which may be threaded with a conventional pipe thread and a plurality of output ports 108 distributed circumferentially about the center axis 106. Outlet ports 108 are preferably formed to receive slip joints of a polyvinylchloride (PVC) type piping. It is to be understood, of course, that the valve body 105 would be made of the same plastic polyvinylchloride (PVC). Valve body 105 also includes a radial port 109 which communicates directly with input port 107. Radial port 109 may be threaded, as indicated in FIG. 6, to receive a conventionally threaded hose bib. As can be seen in FIG. 2, the valve body 105 is connected to an input conduit 14' in the same manner as the previously described embodiment. Input conduit 14' also includes a conventional valve such as globe valve 15' to control the flow of water to valve body 105. Similarly, the output lines 16' and 17' connected to the various ports 108 communicate with pluralities of sprinklers 47' in the conventional manner. It should be noted that, should the user decide to use less than four output ports 108, the unused output ports may be conveniently plugged with conventional fixtures. Valve body 105 has a stepped circular notch 110 located around the outside of the circle of output ports 108. This notch receives selector member 109 which is more fully described below. A cutout portion 131 (see FIG. 4) is formed in sidewall 111 of valve body 105 to receive a detent spring 132 which will be more fully described in relation to the selector member 119.

Referring to FIG. 5, selector member 119 is mounted for rotation about center axis 106 while resting in circular notch 110. Selector member 119 has a circular groove 20' in which an O-ring is positioned to seal input port 107 with U-shaped conduit 121 formed by selector member 119 and a cover member 115. A second kidney-shaped groove 123 is formed on the lower surface of selector member 119 in which a kidney-shaped seal or more conveniently an O-ring distorted to fit therein may be positioned. This seal ring is to seal U-shaped conduit 121 with one of the various output ports 108. An annular piston 152 is slidably mounted in output leg 154 of U-shaped conduit 121. A groove 156 is formed around the perimeter of annular piston 152 to receive an O-ring which forms a seal between annular piston 152 and output leg 154 of selector member 119. A second circular groove 158 is formed around the lower face of annular piston 152. Groove 158 may also receive an O-ring seal to seat against the upper face of valve body 105. It should be noted that groove 123 symmetrically surrounds circular groove 158.

Cover 150 is formed with a central port 160 axially aligned with center axis 106. The purpose of central port 160 will become apparent in the forthcoming discussion. Cover 150 and a cruciform-shaped handle 162 are both affixed to selector member 119 by a plurality of bolts 164. Handle 162 has formed therein a bore 164 which is coincident with axis 160 when handle 162 and cover 150 are positioned on selector member 119. Bore 164 is adapted to slidingly receive a rod 139 that has affixed thereto piston 41' that forms the anti-siphon function of this embodiment. It can be seen from FIG. 5 that piston 41' is free to move upwardly and downwardly dependent upon water pressure applied to conduit 107 so that with pressure in conduit 121, piston 41' is seated against cover 150 as described in the previous embodiment. With no pressure in conduit 121, piston 41' is free to drop downwardly as indicated in FIG. 5 nearby opening port 160 to atmosphere as shown in FIG. 5. This operation of the anti-siphon feature is the same as that described in the previously-described embodiment.

A further mention of cruciform-shaped handle 162 is appropriate at this time. Cruciform-shaped handle 162, as can be seen from FIG. 4, has four upstanding portions extending outwardly from center axis 106 so that a conventional key-type member may be used to turn handle 162 in the manner of ordinary irrigation valves utilized in domestic lawn systems. In addition to the cruciform-shaped handle, one leg of the upstanding members such as leg 166 extends outwardly beyond the circumference of cover 162 and has affixed thereto an upstanding protrusion to facilitate turning of the handle 162, the cover 150 and the selector member 119 to direct water from one output port 108 to another or the turn the system off.

Referring now to FIG. 4, it can be seen that the detent spring 132 mounted in the notch 131 is adapted to seat in one of a plurality of recesses 112 formed in the outer perimeter of selector member 119. These recesses 112 with the described four outlet valves are positioned at 45° points around the periphery of selector member 119.

Operation of this embodiment of the irrigation valve is essentially the same as operation of the previously-described embodiment, with the exception of the annular piston 152 and the kidney-shaped ring mounted about the output of output leg 154. Specifically, annular piston 152 is moved downwardly by water pressure to seat against the upper surface of valve body 105, thereby forming a seal between the two members. The kidney-shaped O-ring 123 maintains the seal between selector member 119 and the valve body 105 upon rotation of the selector member 119 up to the point where communication between output member 108 and output leg 154 is broken through the rotation of selector member 119.

It should be noted that the cooperation of annular piston 152 and its sealed member in groove 123 acts in conjunction with the kidney-shaped seal member in groove 123. That is, a seal is formed at both positions with the selector member either in an on or an off position. During the intervening time, while the selector member is rotated from the on to the off position for one particular port or from the off to the on position, one or the other of the seal members in groove 123 or groove 154 is operable to prevent leakage in the junction between the selector member 119 and cover 150.

It should be noted that retaining ring 27' as described in the first embodiment is utilized in this embodiment to hold selector member 119 adjacent valve body 105 in the same manner as described above.

Thus, it will be seen that the present invention provides a rotary selector valve for directing a fluid into one of a plurality of lines and also a valve that includes an anti-siphon valve. The resulting valve in either embodiment is extremely versatile, convenient, and consolidates the function of a plurality of other valves. Moreover, the simplicity of its construction permits its wide utility at low cost.

Although two embodiments of the invention have been shown and described in the context of a water sprinkling system, it will be apparent that other adaptations and modifications can be made using other fluids and different arrangements of ports, for example, without departing from the spirit and scope of the invention.

I claim:
1. An anti-siphon selector valve comprising:
a valve body having therein an input port and a plurality of output ports disposed about the input port, said valve body further defining a passage communicating said input port to one of said output ports;
a conduit mounted on the valve body and selectively connectable between the input port and one of the other of the output ports so that incoming fluid entering the input port is directed out the one of the other of the output ports, said conduit including piston means for sealingly associating said conduit with the one of the other of the output ports;
anti-siphon valve means mounted on the valve for venting the other of the output ports to the atmosphere through the conduit when the pressure of fluid in the valve is substantially atmospheric; and
wherein the anti-siphon valve means includes a vertically translatable piston mounted in the conduit and is selectively connectable to vent all of the other of the output ports to the atmosphere.

2. The valve of claim 1 including means connected to the conduit for rotating the conduit with respect to the valve body so that the conduit is successively brought into fluid communication with each of the other of the output ports.

3. The valve of claim 2 wherein said rotating means comprises a cruciform-shaped handle.

4. An anti-siphon rotary selector valve comprising:
a valve body having a centrally disposed input port and a plurality of output ports disposed in a circle about the input port, said valve body further defining a passage communicating said input port to one of said output ports;

a hollow selector member housing a rotatable U-shaped conduit having first and second parallel legs and a connecting medial leg, said first leg communicating with the input port and the second leg selectively communicating with one of the other of the output ports so that incoming fluid entering the input port is directed out one of the other output ports, said selector member mounted for rotation about an axis including the first leg, said hollow selector member including piston means for forming a seal between the hollow selector member and said valve body at said one of the other of the output port; and an anti-siphon piston mounted in the conduit and slidable between a first position where the piston seals the conduit from the atmosphere and a second position where the piston vents the conduit to the atmosphere.

5. The valve of claim 4 wherein the conduit assembly includes a kidney-shaped seal and a circular seal mounted symmetrically within said kidney-shaped seal, said pair of seals for sealing said conduit assembly with one of the other of the output ports.

6. The valve of claim 4 wherein the conduit assembly includes seal means for sealing the conduit assembly with the valve body.

7. The valve of claim 4 wherein said seal means includes a kidney-shaped seal.

8. The valve of claim 4 wherein said seal means further includes a circular seal mounted symmetrically within said kidney-shaped seal.

9. An anti-siphon rotary selector valve comprising:
a valve body having a centrally disposed input port and a plurality of output ports disposed about the input port, said valve body further defining a passage communicating said input port to one of said output ports;
a hollow selector housing assembly forming a rotatable U-shaped conduit having first and second parallel legs and a connecting medial leg, said first leg communicating with the input port and the second leg selectively communicating with one of the other of the output ports so that incoming fluid entering the input port is directed out one of the other of the output ports, said selector assembly mounted for rotation about an axis including the first leg, said hollow selector assembly including a piston means mounted in said second leg, said piston movable in said leg to form a seal between said hollow selector assembly and said valve body; and
an anti-siphon piston mounted in the conduit and slidable between a first position where the piston seals the conduit from the atmosphere and a second position where the piston vents the conduit to the atmosphere.

10. The valve of claim 9 wherein the input and the other of the output ports are all disposed with parallel axes in the valve body and wherein the valve includes cruciform means connected to the selector member for rotating the conduit about the axis of rotation that is coincident with the axes of the input port and the first leg of the conduit.

11. The valve of claim 9 including an elongate guide member located in the conduit for guiding the piston between the first and second positions, said guide member having an axis that is coincident with the axis of rotation of the selector member.

12. The valve of claim 9 wherein the other of the output ports are azimuthally spaced apart sufficiently so that the U-shaped conduit is successively blanked off between the output ports by the valve body, thereby blocking the flow of fluid through the valve.

13. The valve of claim 9 wherein the hollow selector assembly includes a kidney-shaped seal and a circular seal mounted symmetrically within said kidney-shaped seal, said pair of seals for sealing said hollow selector assembly with one of the other of the output ports.

14. The valve of claim 9 wherein the hollow selector assembly includes seal means for sealing the hollow selector assembly with the valve body.

15. The valve of claim 14 wherein said seal means includes a kidney-shaped seal.

16. The valve of claim 15 wherein said seal means further includes a circular seal mounted symmetrically within said kidney-shaped seal.

* * * * *